(No Model.) 3 Sheets—Sheet 1.
J. MILLIS.
CONDUCTOR FOR ELECTRICAL APPARATUS.
No. 595,402. Patented Dec. 14, 1897.
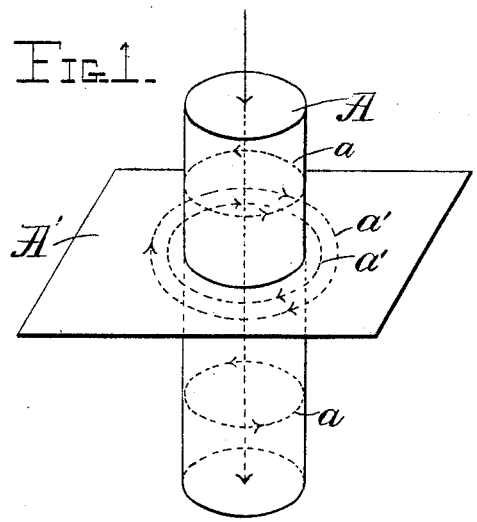
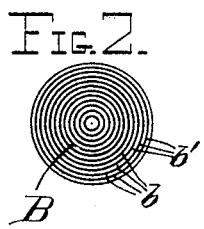
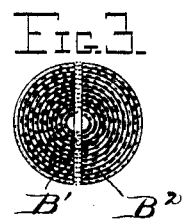
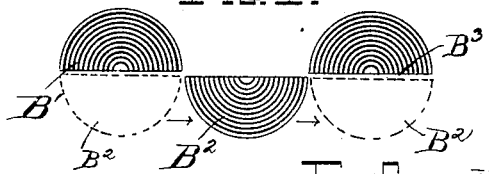
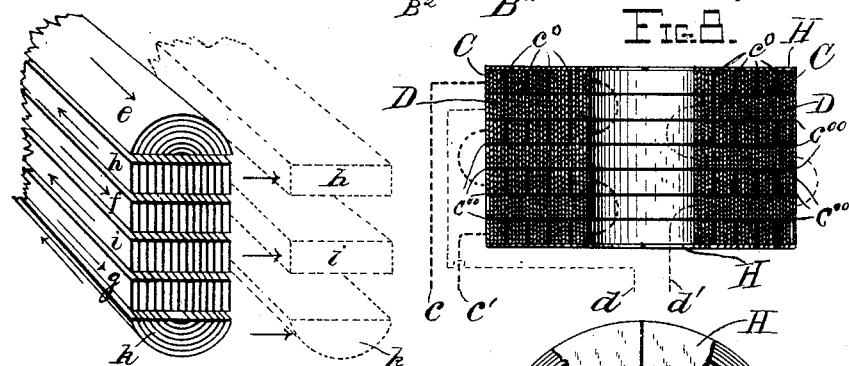
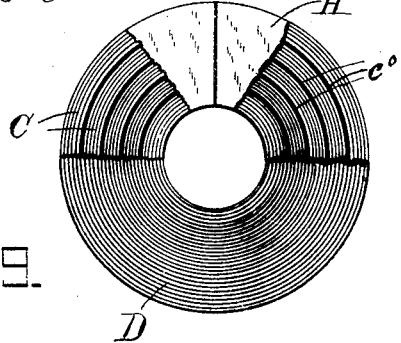
Witnesses
John H. Holt.
L. H. Blakelock.
Inventor
John Millis
by Whitman & Wilkinson
Attorneys.

(No Model.) 3 Sheets—Sheet 2.
J. MILLIS.
CONDUCTOR FOR ELECTRICAL APPARATUS.
No. 595,402. Patented Dec. 14, 1897.
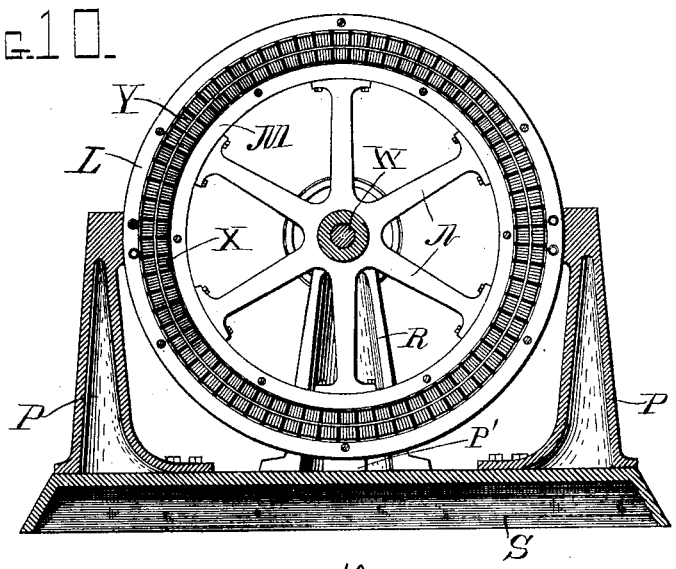
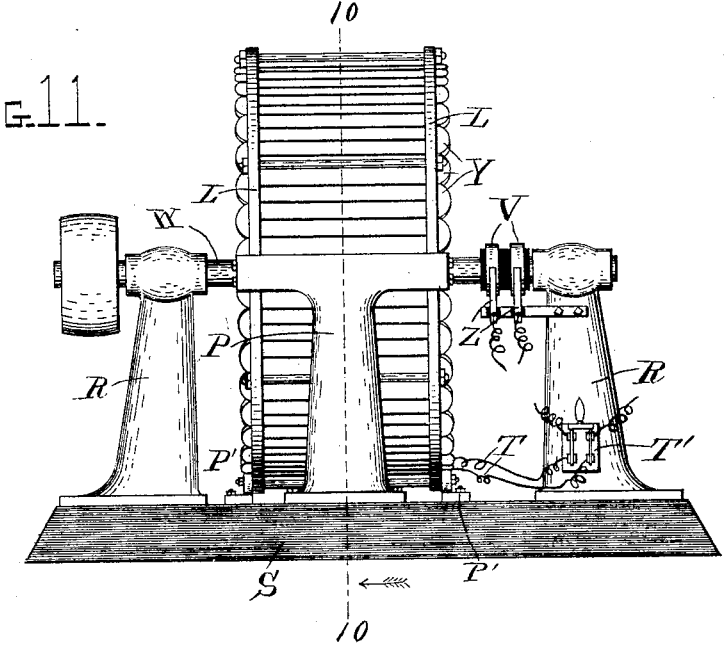
Witnesses
John H. Holt
D. H. Blakelock
Inventor
John Millis,
by Whitman & Wilkinson
Attorneys (No Model.) 3 Sheets—Sheet 3.
J. MILLIS.
CONDUCTOR FOR ELECTRICAL APPARATUS.
No. 595,402. Patented Dec. 14, 1897.
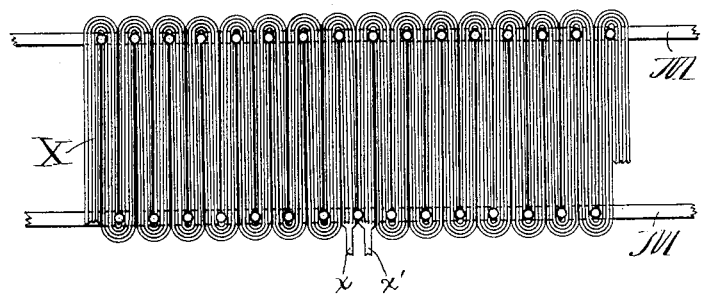
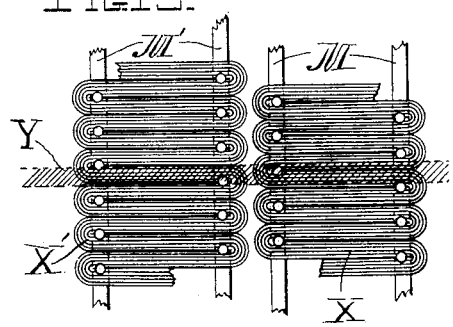
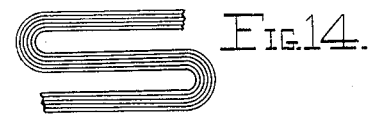
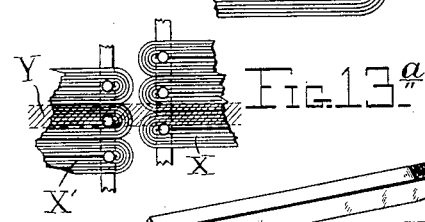
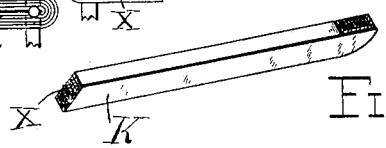
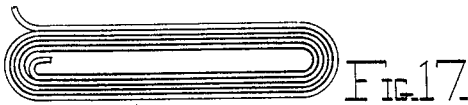
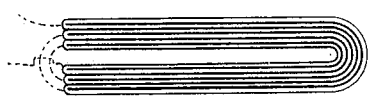
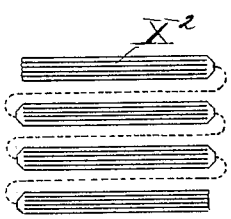
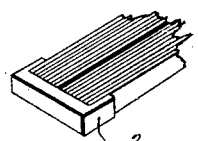
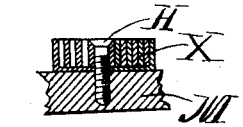
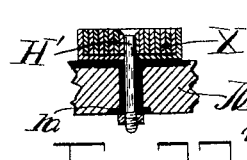
Witnesses
John H. Holt.
D. H. Blakelock.
Inventor
John Millis
by Whitman & Wilkinson
Attorneys.

UNITED STATES PATENT OFFICE.

JOHN MILLIS, OF THE UNITED STATES ARMY.

CONDUCTOR FOR ELECTRICAL APPARATUS.

SPECIFICATION forming part of Letters Patent No. 595,402, dated December 14, 1897.

Application filed March 27, 1897. Serial No. 629,554. (No model.)

*To all whom it may concern:*

Be it known that I, JOHN MILLIS, captain in the United States Army, a citizen of the United States, residing at Washington, in the District of Columbia, have invented certain new and useful Improvements in Electrical Conductors; and I do hereby declare the following to be a full, clear, and exact description of the invention, such as will enable others skilled in the art to which it appertains to make and use the same.

This invention relates to an improved form of electric conductor and its application to the art of generating, transforming, transmitting, and utilizing electricity in the construction of the general class of machines, instruments, and apparatus whose actions depend upon electromagnetic induction either alone or in connection with dynamic effects and relative motion among the parts of the apparatus. Some well-known examples of apparatus of the character referred to are dynamo-electric generators, electric motors, and electric transformers or converters, including induction-coils. Notwithstanding the great variety found in the design and construction of such apparatus there are certain features and principles common to all practical forms heretofore constructed. It will be found that the electrical currents are generated, transformed, and utilized in as well as conveyed by wires or conductors made of metal having a high degree of electrical conductivity, but which is non-magnetic or incapable of becoming magnetized to a sensible degree either permanently or temporarily. The metal most generally used for these conductors is copper. Associated with these non-magnetic conductors will be found in apparatus heretofore constructed other parts essential to the operation of the apparatus, which are made of magnetic metal, and the metal used for this purpose is almost universally iron or steel. These magnetic parts often form in part the framework of the apparatus and the mechanical connections and supports for other parts, but otherwise they perform magnetic functions only. The electrical conductors of apparatus of usual construction are comprised in the armature-coils and field-magnet coils of dynamo-generators and motors, the primary and secondary coils of transformers, the coils of electromagnets, &c. The magnetic parts take the various forms of armatures, armature and field magnet cores, yokes, pole-pieces, cores of transformers and induction-coils, and the like. Aside from their mechanical functions these parts serve only to afford paths for and to direct and apply the magnetic inductive effects commonly referred to as the "lines of force." The magnetic parts are not usually designed to convey currents of electricity. On the contrary, special construction of such parts, in alternating-current apparatus particularly, is generally resorted to in order to prevent the generation in them of "eddy" or "Foucault" currents. Such currents would result in heating of the parts and in loss of efficiency, or they might even render the apparatus entirely inoperative. The magnetic parts are generally massive, they add greatly to the weight of the apparatus, and are frequently of costly construction. They are also the source of a certain loss of efficiency, particularly in alternating-current apparatus, on account of the magnetic "hysteresis" of the metal.

The invention herein to be described consists in a conductor designed to be used for the active parts of the general class of electromagnetic or magneto-electric apparatus above referred to, which conductor will do away, either entirely or to a large extent, with the necessity of using separate parts, performing the functions of magnetic elements and not conveying useful currents.

The improved conductor is made in whole or in part of a material which is both magnetic or capable of being magnetized and an electrical conductor. Such material is preferably iron or steel, and for most applications it should be soft nearly pure iron or low steel combining a high degree of magnetic permeability and electrical conductivity. The desired results are produced by the direct electromagnetic inductive actions between such conductors or between the different parts of one such conductor. These inductive actions alone produce the results, as in static apparatus like converters and induction-coils, or the inductive actions in connection with relative motion or parts are used, as in dynamo-generators, motors, and rotary transformers.

In order to more clearly describe the nature of my invention, reference is had to the accompanying drawings, wherein similar parts are designated by similar letters throughout the several views.

Figure 1 represents a solid soft-iron conductor, showing the direction of the magnetic stresses. Fig. 2 represents an end view of a conductor composed of concentric rings or tubes of soft iron. Fig. 3 represents the conductor shown in Fig. 2 divided in halves. Fig. 4 represents a plurality of the conductors shown in Fig. 3, illustrating the mutual inductive effect. Fig. 5 represents a plurality of conductors constructed according to my improved principle, further illustrating the inductive effect between neighboring conductors. Fig. 6 represents an end view of another form of conductor constructed according to my improved principle, and Fig. 7 represents still another form of the same. Fig. 8 represents a central vertical section of a static transformer constructed with my improved conductors, and Fig. 9 represents a top plan view of the same with a portion of the top conductor broken away. Fig. 10 represents a vertical section along the line 10 10, Fig. 11, and looking in the direction of the arrow, showing the application of my improved conductor to the construction of dynamo-electric machines or motors. Fig. 11 represents a side elevation of the same machine. Fig. 12 represents a development of a part of the armature-coils of the machine shown in Figs. 10 and 11, and Fig. 13 shows an arrangement of the conductors when used in the generation of two-phase currents. Fig. 13ª shows the arrangement of the conductors for a two-phase motor. Fig. 14 represents a form of conductor similar to those shown in Figs. 12 and 13, except that the folds are wider apart than in those shown above. Fig. 15 represents an enlarged perspective view of a part of the conductor shown in Fig. 12, showing how the conductor is inclosed on three sides by a continuous magnetic-metal envelop or trough. Fig. 16 represents a conductor in which the different laminæ are connected in multiple. Fig. 17 represents a conductor in which the laminæ are in series, and Fig. 18 represents laminæ of the conductor connected in multiple series. Fig. 19 represents, diagrammatically, a method of connecting adjacent conductors, different from that shown in Fig. 12; and Fig. 20 is an enlarged perspective view showing a form of connector for the ends of adjacent conductors. Fig. 21 is a sectional view showing a means of attaching the conductors of the machine shown in Figs. 10 and 11 to the supporting-rings when the rings are made of non-conducting material. Fig. 22 is a similar view representing a way of accomplishing the same result when the rings are made of metal. Fig. 23 represents a conductor composed of laminations of different metals.

A, Fig. 1, represents a soft-iron rod. Now suppose a current of electricity to be passed through this rod in the direction of its length—as toward the bottom of the figure, for example. In accordance with well-established laws the metal of the rod will be polarized or magnetized while the current is passing, and the direction of this magnetization will be represented by the circumferences of circles whose planes are perpendicular to the axis of the rod and which have their centers on that axis. The direction and degree or intensity of the magnetization or magnetic stress will depend upon the direction and strength of the current which produces the magnetization. If, therefore, the current be varied in strength, a corresponding change will follow in the magnetic stress, and if the current be reversed in direction the direction of the magnetic stress will be reversed. Conversely, if the transverse magnetization or magnetic stress (represented by lines $a$) be varied in strength or direction corresponding changes in the current flowing along the rod will result. The transverse magnetic stress in the rod resulting from the passing current produces magnetic stresses external to the rod, and the direction of these external stresses may be represented by the circumferences of circles $a'$, whose planes are perpendicular to the axis of the rod and whose centers lie in that axis. These external inductive magnetic effects are illustrated by the well-known experiment of iron filings sprinkled on the card $A'$. These filings tend to arrange themselves in circles $a'$ when a current is passing, which circles are ordinarily called "lines of force." The well-known inductive effects which take place between parallel electric conductors are explained by these lines of force, as are also the relative motions of such conductors when they are conveying currents and are not relatively fixed in position. The laws of inductive actions between such conductors and the forces of attraction and repulsion developed are well-known principles of the science of electricity and magnetism.

As explained above, the current in conductor A produces magnetic stresses which are perpendicular to the axis of the conductor, but do not intersect the axis. Similarly a change in the magnetic stress at any point in the conductor, regarded as a cause, tends to produce a current around this point and in a plane perpendicular to the direction of the magnetic stress. As a result of this, when the current is rapidly changing in strength and direction, as when an alternating current is sent through A, the current in the interior of the conductor is very much reduced by mutual interferences, and the current therefore passes principally on the outer portions. This is commonly known as the "skin effect." Now let the iron rod be split up by surfaces of cylindrical shape and parallel to the axis, so that instead of a solid rod we have one made up of a number of thin concentric tubes or shells, and let these tubes or shells be separated by layers of insulating material, like paraffined paper. An end view of such a conductor is shown in Fig. 2. B is the conductor, composed of concentric tubes made of soft iron or steel $b$, with intervening layers of insulation $b'$, as shown. By this construction the continuity of the metal in the direction of the length of the conductor, as well as in circular directions around the axis, is preserved. With the same area of cross-section of metal the electric conductivity for steady currents is as great as in a solid conductor and the magnetization or transverse magnetic stresses, resulting from a current through the conductor, have also uninterrupted paths through the metal in circular directions around the axis. The continuity of the metal in all directions intersecting the axis is, however, interrupted at numerous points by the insulation. By making the layers of metal sufficiently thin the possibility of eddy-currents or current actions in directions intersecting the axis may be practically removed. Now let the conductor be split lengthwise into two similar parts $B'$ and $B^2$, Fig. 3, and let these parts be separated a short distance, remaining parallel, with a thin layer of insulation or a space between them. Under these circumstances the conditions are highly favorable for the various electromagnetic inductive actions and the dynamic effects which take place between parallel conductors in accordance with the well-known laws of electromagnetic induction. The lamination of the conductors and the intervening layers of insulation cut off detrimental cross-current actions or eddy-current effects, while the lines of forces or lines of electromagnetic induction have free paths through iron, which enable them to act with the greatest facility to produce the desired results. The directions of these lines are indicated in Fig. 3 by the dotted lines, by which it will be seen that the magnetic stresses are transmitted throughout by continuous iron except over the small gap or thin layer of insulation between the conductors.

If the conductors $B'$ and $B^2$ are fixed in relative position and each forms part of a completed electrical circuit, an alternating or inconstant current sent through one will induce a corresponding current in the other. If the conductors can move relatively to each other and currents in opposite directions are sent through both, they will repel each other. If currents in similar directions are sent through them, they will attract each other. If a continuous current be sent through one and the other be moved relatively to the first, a current will be generated in the second one according to the general law. Fig. 4 shows conductors capable of motion relative to each other in accordance with the above.

Instead of the circular form or semicircular form for the section of the conductors it is evident that many other forms may be made, the principles of action remaining the same, and also that any number of conductors may be combined upon principles already explained for two. Thus in Fig. 5 six conductors are shown placed parallel to each other, and when carrying currents the inductive actions between them will be as above described. For instance, if $e$, $f$, and $g$ are connected in multiple to form part of one circuit and $h$, $i$, and $k$ are similarly connected to form part of another circuit an alternating current sent through one set will generate an alternating current in the other. Again, if one set $h$ $i$ $k$ is made movable with respect to the other set $e$ $f$ $g$ relative motion will take place, as indicated, the movable conductors passing to the position shown in dotted lines, when an alternating current is sent through set $e$ $f$ $g$, or currents may be generated by the application of external power to cause such relative movement to take place.

Some practical applications of this invention to electrical apparatus will now be described and illustrated:

Referring to Figs. 8 and 9, the transformer is made up of a number of flat spiral coils of soft-iron ribbon C and D. In coils D the ribbon is simply coiled up, with insulating material to prevent contact between contiguous turns. Coils C are formed by first making compound conductors of the desired number of ribbons similar to those in coils D with insulation between the ribbons. This compound conductor is then coiled up, as shown. The spiral for the outside of the converter may have an additional U-shaped strip of iron ribbon placed over it to better utilize the electromagnetic inductive effects, or, in other words, to reduce the magnetic leakage, as shown in Fig. 6, or thin sheet-disks H may be put over the top and bottom, as shown, for the same purpose, with radial cuts to interrupt useless currents. The coils are so laid or placed that the connections will come alternately inside and outside the converter for greater convenience, as shown in Fig. 8. If used as converters are commonly used for transforming currents of high potential to those of lower potential, coils D would constitute the primary circuit with terminals at $d$ $d'$, and coils C would be the secondary circuit with terminals at $c$ $c'$, the heavy dotted lines representing the primary connections and the light dotted lines the secondary. To better insure the perfection of the insulation, sheets and strips of insulating material, like mica, may be placed between the coils, as at $c^0$ and $c^{00}$. It is obvious that these transformer-coils may be placed in oil insulation, as is frequently done with transformers. Connections for the terminals, safety cut-outs, and other accessories are of course to be provided, and the coils are to be properly secured in fixed relative positions. The terminals of the various coils may be brought to suitable terminal connectors accessible for adjustment, so that the converter may be altered for various effects without disturbing its interior construction. Besides single converters those designed for polyphase currents of any desired characteristic may be constructed on the same principle. Figs. 10 and 11 show the application of this form of conductor to the construction of a dynamo-generator or an electric motor.

The conductors X and Y are made of iron or soft-steel strips with insulation between the strips, as already described. The conductors X are secured to the rings M, concentrically supported by spider-arms N on the shaft W. This shaft is supported in bearings mounted on supports R, which are secured to a suitable base S. The shaft and its attachments, including the conductors X, are free to turn about the axis with the shaft. The rings L L support the conductor Y, and these latter rings are rigidly secured by uprights P and braces P' in positions concentric with rings M and in planes parallel to the planes of rings M. Conductors Y are secured to the inner surfaces of rings L. Rings L and M may be made of insulating material, like "fiber," or of metal. If made of metal, the conductors should be secured to them without electrical connection, as by interposition of insulating material, as shown in Fig. 22. The terminals $x\ x'$ of the conductor X (see Fig. 12) may be connected to the collector-rings V in any convenient manner—as, for example, the conductors from the terminals $x\ x'$ may be carried down one of the spider-arms and thence through a hollow in the shaft W to the rings, as is usually done in dynamo construction. The conductors T from the terminals of the conductors Y are carried to a switch T' on the upright R.

Fig. 12 represents a development of the conductor X, carried in the rings M, showing the terminals $x\ x'$ of the said conductor. As the conductors X and Y are similar and the method of securing them to the rings is the same, a description of one will suffice for both. The conductor X, as shown, is folded upon itself and secured to the rings M by means of screws or bolts H. If the rings M are non-conductors of electricity, the method for securing them, as shown in Fig. 21, may be adopted, or if of conducting material the arrangement shown in Fig. 22 may be employed, where H' is a bolt passing through the conductor and ring and insulated from the latter, as at $m$. It is obvious that any convenient and practical means may be employed for securing the conductors to their supports. The conductors may also be folded, as shown in Fig. 14, leaving a greater space between parallel parts of the conductor. In order to prevent leakage of the magnetic lines on the sides of the conductor when the lines will not be available, the strips of the conductor may be covered on three sides by the outer troughs of thin iron K, as shown most clearly in Figs. 6 and 15, or they may have a thin flat iron backing K', as shown in Fig. 7. When thus made, the main part of the conductor may be made continuous and folded back and forth, as in Fig. 12, the covering-piece being cut out or otherwise formed and then placed on the conductor and secured thereto. There are obviously many ways of connecting the conductors for different purposes. For example, the different laminæ or strips may be connected in multiple, as shown in Fig. 16, or in series, as in Fig. 17, or in multiple series, as in Fig. 18. Instead of folding the conductors upon themselves they may be made in separate pieces, as shown in Fig. 19, and their ends connected alternately, as shown, by suitable conductors. If the adjacent conductors are very close together, the means shown in Fig. 20 may be used, where $Q^2$ represents a copper end piece in electrical connection with the strips of the conductors.

Returning now to the operation of the machine shown in Figs. 10 and 11, let a continuous current from some external source be sent through one set of the conductors, as Y, by conductors led from the external source to the terminals of that conductor. If the shaft be now revolved, and with it the attached rings and conductors X, an alternating current will be generated in these conductors, which may be led off on the brushes Z and utilized. The apparatus is therefore a separately-excited alternating-current generator. If two such machines are placed end to end, shafts in line and rigidly connected, so that the conductors X of one machine have the proper angular advance in relation to the corresponding conductors of the other, while the conductors Y of both machines are in line, the combination will form in effect a separately-excited two-phase generator. Similarly a two-phase generator may be constructed by using in the same apparatus two sets of conductors X X', as in Fig. 13, and one set of conductors Y, which latter are made long enough to extend over both X and X'. Upon the same principle by using three sets of conductors X a three-phase generator is made. Obviously a machine of any number and combinations of phases may be built by extending the principles of construction above described. If used as a two-phase motor, the conductor X, Fig. 13$^a$, would be given angular advancement equal to one-half the thickness of X' or X. By placing commutators on the shaft to properly direct the currents the machine becomes a continuous-current generator or motor. Thus by means of a commutator a continuous current applied to the terminals Z is made to pass in alternate directions through the conductor X, and conductor Y being short-circuited the machine runs as a motor. Similarly if coils Y are excited by a continuous current the alternating current generated in conductor X may, by means of a commutator attached to the shaft, be rectified or all the pulsations given the same direction.

While the construction shown in Figs. 10 and 11 with the magnetic conductors secured to cylindrical surfaces and in a position parallel to the axis of revolution is practical and simple, many variations of this form are entirely practicable. The conductors may be inclined to the axis at any desired angle instead of being parallel to it. There may be more than two concentric cylinders and sets of conductors, or the conductors may be arranged radially about the shaft in planes perpendicular to it, &c.

In general the conductor is made of thin strips of wrought-iron or low steel, which are preferably rolled for the purpose, but which may be cut from sheet metal. These strips are given such width and shape and are assembled in such manner as to give the conductor the required construction and cross-section. It is in general desirable to make the insulation between these strips as thin as practicable. The insulation may consist of a coating of varnish or enamel on the strips, or material like mica or paraffined paper may be used. The strips are held together by external wrapping, by clamps, by rivets or bolts, or any other suitable means. The conductor may not be made entirely of magnetic metal; but strips of other metal, like copper, may be combined with the iron strips to reduce the electric resistance or for other reasons. Such a conductor, made of alternate strips of copper and iron, with a U-shaped envelop, made of iron, is shown in Fig. 23, in which Q is the iron and Q' the copper.

While plain flat strips of uniform width and thickness for a given conductor will ordinarily be used as far as practicable to simplify the construction, the invention is not limited to these conditions. The conductor may be divided into separate lengths connected by lengths of conductors, made of copper or other metal, the form of cross-sections of the conductor may be varied at different points in the same conductor, or the position of the cross-section at one point may be relatively different from that at another, as when the conductor is twisted about its longitudinal axis, &c.

Among the advantages gained by the applications of this conductor are greater simplicity and economy in construction and reduction in weight of apparatus for a given output. The losses due to hysteresis, which occur in some forms of apparatus as now constructed, are also reduced.

A great variety of applications other than those mentioned or indicated will suggest themselves to electricians—such as in telegraph apparatus, electric bells and signals, regulating devices for electric light and power machinery, measuring and test instruments, &c. In fact, the applications of this device extend to the larger part of the appliances that involve directly or indirectly the principles and laws of electromagnetic induction.

Having thus described my invention, what I claim, and desire to secure by Letters Patent of the United States, is—

1. An electric conductor made of thin strips or laminations of material which is both a conductor of electricity and also capable of being affected by, and of readily transmitting magnetic force or influence, and having the laminæ separated by insulating material, substantially as described.

2. An electric conductor composed of strips or laminæ of iron or soft steel separated by an insulating substance, and so arranged as to afford uninterrupted paths for electric currents only in directions along the length of the conductor, while the transverse magnetic stresses are afforded nearly or quite free paths through the metal of the conductors, substantially as described.

3. An electric conductor composed of laminations of material which is both a conductor of electricity and also capable of being affected by, and of readily transmitting, magnetic force or influence, an insulating substance separating the laminæ of said conductor and the said laminæ so disposed as to afford uninterrupted paths for electric currents only in directions along the length of the conductor, while the transverse magnetic stresses are afforded nearly or quite free paths through the metal of the conductor, substantially as described.

4. Electrical apparatus dependent upon the direct electromagnetic inductive effects of its active parts, in which the parts between which said inductive effects take place, are all conductors of electricity and magnetic in their action, substantially as described.

5. In a dynamo-electric machine having an armature whose coils are both conductors of the electric current and magnetic in their action, and the field of said machine being composed of coils similar to the armature-coils substantially as described.

6. In a dynamo-electric machine or motor, the combination with a movable conductor composed of laminations of material, which is both a conductor of electricity and magnetic in its action, and having the laminæ of said conductor separated from each other by insulating material, of a stationary conductor of similar structure mounted near and parallel or nearly so to said movable conductor, and the laminated conductor so arranged as to afford uninterrupted paths for the electric currents only in directions along their lengths, while the transverse magnetic stresses are afforded nearly or quite free paths through the metal of each conductor, substantially as described.

7. In a dynamo-electric machine or motor, the combination with a plurality of movable conductors, composed of laminations of material which is both a conductor of electricity and magnetic in its action, and having the laminæ of said conductor separated from each other by insulating material, of a plurality of stationary conductors of similar structure, mounted near and parallel or nearly so to said movable conductors, and the laminæ of all the said conductors so arranged as to afford uninterrupted paths for electric currents only in directions along the lengths of the conductors while the transverse magnetic stresses are afforded nearly or quite free paths through the metal of the conductors, substantially as described.

8. In a dynamo-electric machine the combination with a plurality of conductors composed of laminations of material which is both a conductor of electricity and magnetic in its action, and the laminæ of said conductor separated by insulating material, a shaft and means for securing said conductors at intervals from each to and around the said shaft, a frame having bearings in which said shaft is journaled, a plurality of stationary conductors of similar structure secured in a frame and inclosing and concentric with the movable conductor and the laminæ of all the said conductors so arranged as to afford uninterrupted paths for electric currents only in directions along the lengths of the conductors, while the transverse magnetic stresses are afforded nearly or quite as free paths through the metal of the conductors, substantially as described.

9. An electric conductor constructed in whole or in part of magnetic material, properly insulated and designed for use as the active parts of the general class of electromagnetic or magneto-electric machines, instruments and apparatus, in which the desired results are produced by the direct electromagnetic inductive effects between different conductors or between different parts of the same conductor, either with or without dynamic action and relative motion of the conductors or parts of conductor, substantially as described.

In testimony whereof I affix my signature in presence of two witnesses.

JOHN MILLIS.

Witnesses:
ALLEN C. McDONALD,
MAX HANSMANN.